United States Patent [19]
Chen

[11] Patent Number: 5,634,029
[45] Date of Patent: May 27, 1997

[54] APPARATUS FOR INTERCHANGING FLOPPY DISKETTE DRIVE ASSIGNMENTS

[75] Inventor: Chih-Hsien Chen, Hsinchu Hsien, Taiwan

[73] Assignee: United Microelectronics Corporation, Hsinchu, Taiwan

[21] Appl. No.: 529,733

[22] Filed: Sep. 18, 1995

[51] Int. Cl.$^6$ ................................................. H01H 9/00
[52] U.S. Cl. ........................... 395/404; 326/62; 307/127
[58] Field of Search ........................ 395/404, 438; 326/62; 307/127, 134

[56] References Cited

U.S. PATENT DOCUMENTS 5,194,758  3/1993  Ver Meer .................. 307/125 X

OTHER PUBLICATIONS

Chen, Youg; bboot.doc file from "Drive B Boot Utility" from ftp.uu.com/systems bboot.zip, Apr. 1993.
Dynex Personal Computers User Guide, Release 1.0, 1991, pp. 1–15.

Primary Examiner—David L. Robertson
Attorney, Agent, or Firm—Cushman Darby & Cushman, L.L.P.

[57] ABSTRACT

A floppy diskette drive assignment interchanging apparatus for interchanging the drive letter assignments in a computer system is disclosed. The floppy diskette drives have a drive data cable that includes a number of data lines. The interchanging apparatus comprises an interchange control logic and an assignment interchange logic. The interchange control logic generates an optional interchange control signal, the interchange control signal signifies the requirement for interchange when it is in a first logic state, and signifies the requirement of maintaining no interchange when it is in a second logic state. The assignment interchange logic has a set of inputs connected to each of the data lines among the drive cable data lines that require interchanging, and has a set of outputs for outputting the set of inputs with an output assignment of either a forward or reverse order determined by the active and inactive status of the interchange control signal.

8 Claims, 1 Drawing Sheet

APPARATUS FOR INTERCHANGING FLOPPY DISKETTE DRIVE ASSIGNMENTS

BACKGROUND OF THE INVENTION

1. Field of the Invention

The present invention relates in general to an apparatus for interchanging floppy diskette drive (FDD) letter assignments in a computer system. In particular, the present invention provides an apparatus for interchanging floppy diskette drive assignments in a computer system that is independent of the operating system installed.

2. Description of Related Art

Floppy diskette drives for computers, although considered today to have a small data storage capacity and relatively slow read-write access, are still indispensable devices for modern microprocessor-based computer systems. One of the more important functions of a floppy diskette drive is to allow the computer to be booted to a particular operating system regardless of what system may be stored on a hard drive of the computer. This is particularly important during initial setup of the computer and during maintenance or repair.

Commercially available floppy diskette drives include, among others, the so-called mini-floppy diskette and micro-floppy diskette drives. The mini-floppy drive, which holds approximately 1.2M or 360K bytes, is more frequently referred to as the five-and-a-quarter-inch (5.25-in) drive, while the micro-floppy drive with a normal capacity of either 1.44M or 720K bytes is referred to as the three-and-a-half-inch (3.5-inch) drive. While 3.5-in drives are becoming more and more popular, there is still a considerable number of installed computer systems operating with 5.25-inch drives.

The co-existence of the two type of different diskette drives has caused some inconvenience in the use of floppy diskettes, both at the user and the software supplier ends. Most modern application software programs allow for the installation from either the A or B drive of a computer system, regardless of either the A drive is a 5.25 or a 3.5-inch drive, or vice versa. However, the installation, or maintenance and repair of operating system products require that the boot diskette be in the physical drive A. It is not unusual for a user to have at hand a copy of a software program that is distributed in 5.25-inch diskettes while the computer system to be used has a 3.5-inch floppy diskette drive installed as the physical drive A and a 5.25-in drive installed as drive B.

A computer user having a software package with a mis-matched drive A on the computer system has two ways to overcome the problem. Either the software package will have to be replaced with a version on a set of compatible floppy diskettes, or the A and B drive physical connection will have to be interchanged. Some users may not want to spend the time or money involved in the replacement of the software diskettes. On the other hand, the complexity involved in the interchange of the drives arrangement depends on the hardware design of the computer system.

Some computer systems have included in their firmware a drive swapping feature for swapping the drives. However, other systems require that the physical cable connection for the A and B drives be interchanged.

To physically interchange the connection of the floppy diskette drives in a computer system, the user must have sufficient knowledge of the interconnection for the floppy diskette subsystem. Not all users have this knowledge or the confidence to perform this drive swapping operation. For those users capable of implementing the interchange, the drive cable may not be sufficiently long to achieve the drive connection interchange.

Those computer systems with a firmware drive swapping feature do provide the apparent functionality of interchanging the drive letter arrangement. In other words, the drives physically installed in a computer system with one selected drive naming arrangement may be interchanged by executing a software routine. For example, in the IBM-compatible 80×86-based personal computer systems, the BIOS (basic input/output system) programs published by American Megatrends Incorporated of Norcross, Ga., U. S. A. provide a drive A-B swapping feature in the BIOS setup utility that allows for the swapping of a floppy drive physically installed as B to be "swapped" as the logical A drive in the system.

However, while such a drive swapping scheme prevents the need to actually change the cable connection inside the computer system unit, this scheme relies on the drive parameter modification in relation to the interrupt service routine (ISR) of the BIOS program in the computer system. For most application software programs that direct their floppy diskette drive accesses via the ISR, this works fine. With those other operating systems, such as Operating System/2 published by International Business Machines Corporation, this ISR-related drive swapping scheme is useless, because these operating system products bypass the ISR altogether when they access the floppy diskette drives.

On other occasions, there is also the need to interchange the drive assignment letters. For example, when drive A of a system fails, a interchanging capability would allow the swap of the other drive as the drive A on a temporary basis, before the failed drive is repaired or replaced.

SUMMARY OF THE INVENTION

It is therefore an object of the present invention to provide an apparatus for interchanging floppy diskette drive assignments in a computer system that is independent of the operating system installed.

It is another object of the present invention to provide an apparatus for interchanging floppy diskette drive assignments in a computer system that is transparent to operating systems and application programs.

The present invention achieves the above-identified objects by providing a floppy diskette drive assignment interchanging apparatus for interchanging the drive assignments in a computer system. Floppy diskette drives have a drive data cable that includes a number of data lines. The interchanging apparatus according to the present invention includes an interchange control logic and an assignment interchange logic. The interchange control logic generates an optional interchange control signal CO, the interchange control signal CO signifies the requirement for interchange when active (first state), and signifies that no interchange is called for when inactive (second state). The assignment interchange logic has a set of inputs for connection to respective data lines among the drive cable data lines that require interchanging, and has a set of outputs for outputting signals on corresponding lines based on an output assignment determined by the state of the interchange control signal CO. In the presently preferred embodiment of the invention, the assignment interchange logic outputs the data lines that require interchanging in an "inverted" order such that the first of the input data lines corresponds with the last of the outputs, the second of the input data lines corresponds with the second to last of the outputs, etc. when the interchange control signal is set to the active (first) state. The assignment interchange logic outputs the data lines that require interchanging in a "normal" order wherein the first of the input data lines corresponds to the first of the outputs, the second of the input data lines corresponds to the second of the outputs, etc. in a forward order when the interchange control signal is set to the inactive (second) state.

BRIEF DESCRIPTION OF THE DRAWINGS

Other objects, features, and advantages of the present invention will become apparent by way of the following detailed description of the preferred but nonlimiting embodiments. The description is made with reference to the accompanying drawings in which.

DETAILED DESCRIPTION OF THE PREFERRED EMBODIMENT

Figure 1:
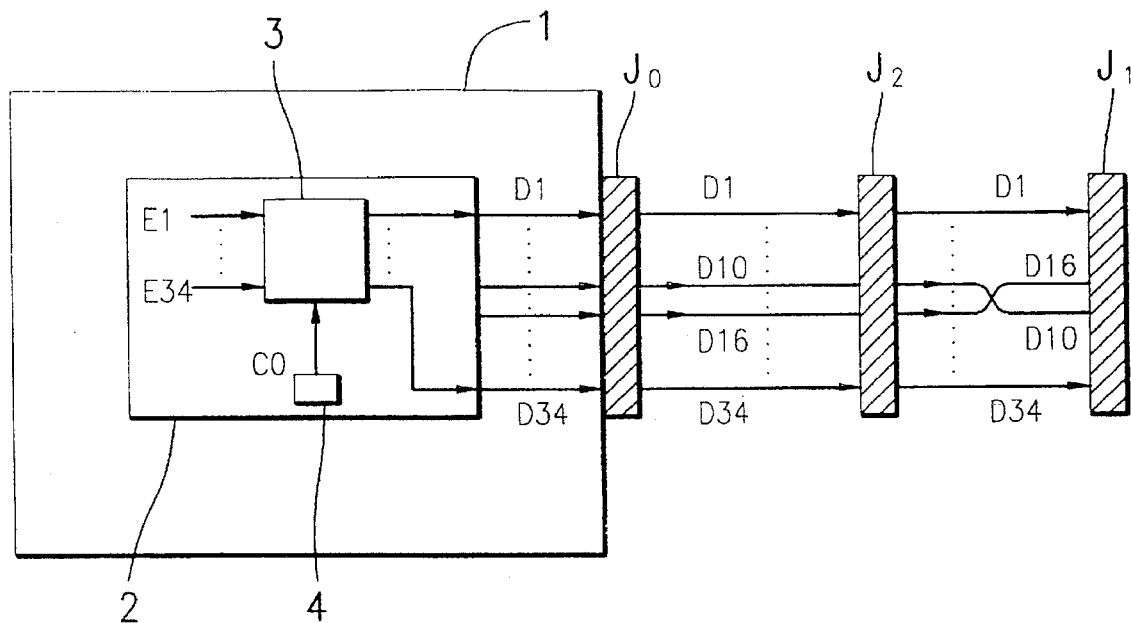
FIG. 1 schematically shows the block diagram of a floppy diskette controller subsystem employing the interchanging apparatus of the present invention.

In general, a computer system employs a floppy diskette subsystem to fulfill the need of floppy diskette-based data storage and retrieval. As is seen in FIG. 1 is a block diagram of a floppy diskette drive (FDD) controller subsystem that includes the interchanging apparatus of the present invention for providing easy drive letter assignment swapping. The floppy diskette controller subsystem comprises a FDD interface adapter 1 that includes a FDD controller logic 2. FDD controller logic 2 includes a FDD assignment interchange logic 3 that is integrated into FDD controller logic 2 to provide the drive letter assignment interchange capability. An interchange control logic 4 provides a control signal CO to FDD assignment interchange logic to control the swapping of drive letter assignment.

The FDD interface adapter 1 has a connector that can have attached thereto a floppy diskette drive data cable that serves to electrically connect the drives to the FDD interface adapter 1. The drive data cable includes three connectors, J0, J1, and J2. Connector J1 connects to physical drive A (not shown). Connector J2 connects to physical drive B (not shown). Connector J0 connects to FDD interface adapter 1.

The drive data cable, shown only schematically in the drawing, in the case of the IBM-compatible computer systems, is a 34-wire parallel cable. For convenience and ease of explanation, this description is based on this popular 34-wire cable. It is understood, of course, that the invention is not limited to this particular cable arrangement. In the process of the description of the present invention, these 34 data signal wires are labeled as D1, D2, . . . D34, respectively. The section of the drive data cable between the interface adapter connector J0 and the physical drive B connector J2 have all 34 wires connected in parallel, and in the section between the two physical drive connectors J1 and J2, all wires except wires D10, D11, D12, D13, D14, D15 and D16 are still connected in parallel. By convention, the parallel connection between two 34-pin connectors, either between connector J0 and J2, or between J2 and J1, defines that pin 1 of a first connector is connected to pin 1 of a second connector, pin 2 of the first connector is connected to pin 2 of the second connector, etc.

The seven wires between drive connectors J1 and J2 that correspond to data wires D10–D16 are not connected in the "parallel" manner described above. Rather, they are connected in a "twisted" manner. Pin 10 of connector J2 is connected to pin 16 of connector J1, etc. as indicated in the following table.

| J2 pin # | J1 pin # |
|---|---|
| 10 | 16 |
| 11 | 15 |
| 12 | 14 |
| 13 | 13 |
| 14 | 12 |
| 15 | 11 |
| 16 | 10 |

The twisting is easily done by physically twisting as a group the seven data wires 180 degrees before they are submitted to the connector for connection. In the case of the IBM compatible computers, these seven twisted data wires are utilized for the purpose of identifying each of the two drives connected to one data cable. The floppy drive connected to the twisted connector J1 is, in general, the physical drive A, while the drive connected to the un-twisted connector J2 is the physical drive B.

When, however, the seven identifying data lines E10–E16 among the 34 data lines E1–E34 within the FDD controller logic 2 are twisted in the same way as that between the two physical drive connectors J1 and J2 described above before being connected to the interface adapter connector J0, the equivalent result of the electrical connection would be the swap of the two physical drive connectors J1 and J2. This is because that the electrical connection at connector J2 would now have one twist in its pin connections, while the connector J1 would have another twist in its pin connections that undoes the first twisting. The direct result is that physical drive connector J2 would now be identified as physical drive A and physical drive connector J1 be identified as physical drive B.

The FDD assignment interchange logic 3 serves this internal data line twisting in a selectable manner. An interchange control logic 4 in FIG. 1 determines whether or not the internal twisting within the FDD controller logic 2 should take place.

Figure 2:
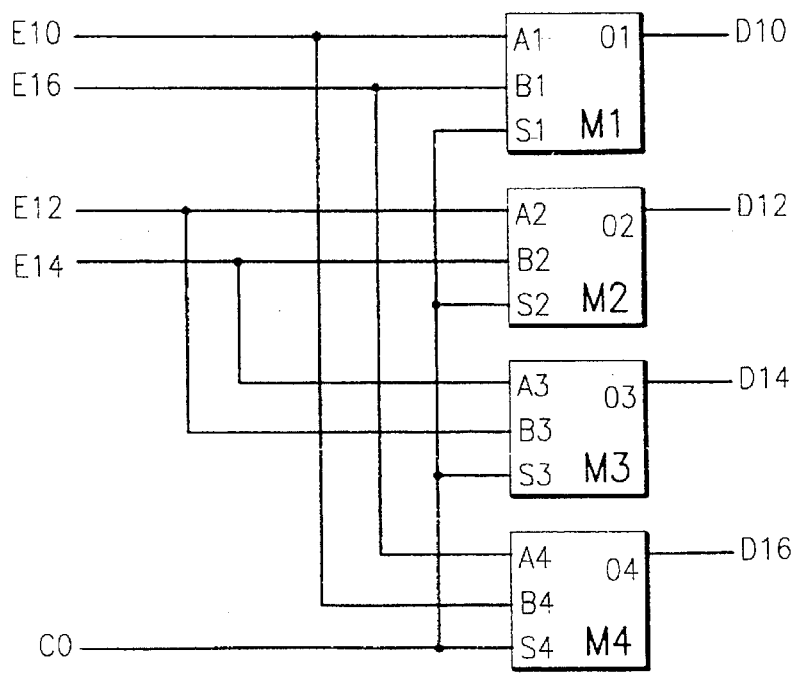
FIG. 2 is a schematic diagram showing the circuit details of the floppy diskette drive assignment interchanging logic 3 shown as a block in FIG. 1.

FIG. 2 is a schematic diagram showing the detailed circuit arrangement of the drive assignment interchange logic 3, shown as a block in FIG. 1. Interchange logic 3 serves as the core of FDD controller logic 2. FDD assignment interchange logic comprises four multiplexers M1, M2, M3 and M4. These four multiplexers are two-to-one multiplexers, each having an A and a B input selected by a selection input S and multiplexed to the O output.

Among the seven drive assignment identifying data lines E10–E16 of the 34 data lines E1–E34 within the floppy diskette drive controller logic 2, four are involved in the drive assignment. They are E10, E12, E14 and E16 data lines. The other three data lines E11, E13 and E15 are tied to ground, and hence are always connected to ground whether or not they are twisted for drive re-assignment.

To implement the drive re-assignment, the A input of the first multiplexer M1 and the B input of the fourth multiplexer M4 are connected together to the tenth line of the drive data cable, the E10, the A input of the second multiplexer M2 and the B input of the third multiplexer M3 are connected together to the twelfth line of the drive data cable, the E12, the B input of the first multiplexer M1 and the A input of the fourth multiplexer M4 are connected together to the sixteenth line of the drive data cable, while the B input of the second multiplexer M2 and the A input of the third multiplexer M3 are connected together to the fourteenth line of the drive data cable. The selection inputs of all four multiplexers are connected together to the same interchange activation signal CO, as issued by the interchange control logic 4 (FIG. 1).

The logical state of the interchange activation signal CO determines the multiplexed output of all the four multiplexers. For example, when the interchange activation signal CO is issued as a logical zero, the four multiplexers M1, M2, M3 and M4 all have selected their respective A inputs, so that the four multiplexers M1, M2, M3 and M4 output E10, E12, E14 and E16 of the drive data cable respectively. On the other hand, when the interchange activation signal CO is issued as a logical one, the four multiplexers M1, M2, M3 and M4 would output E16, E14, E12 and E10 of the drive data cable respectively. Thus, the status of the interchange activation signal CO determines whether or not the seven drive assignment identifying data lines E10–E16 of the 34 data lines E1–E34 within the floppy diskette drive controller logic 2 should be electrically twisted in order.

The interchange activation control signal CO may be generated by a simple hardware switch controlled at the will of the user of the computer system. Or, the signal CO may be stored in a designated register as a control bit that allows to be set by the user of the computer system via software means.

Thus, since this floppy drive assignment interchanging apparatus allows the selection of whether or not the drive identifying data lines should be twisted at the lowest possible hardware level, they are by no means affected by whether or not the BIOS ISR is called in a operating system whenever the drive service functions are required. The interchanging apparatus, on the other hand, can be integrated inside the floppy diskette drive controller logic (reference numeral 2 of FIG. 1), regardless of their make, either in a single controller chip, or in a discrete logic.

What is claimed is:

1. A floppy diskette drive assignment interchanging apparatus for interchanging the drive assignments in a computer system, the floppy diskette drives having a drive data cable including a plurality of data lines, the interchanging apparatus comprising:

an interchange control logic for generating an interchange control signal, the interchange control signal signifying a requirement for drive letter assignment interchange when in a first state, and signifying no interchange when in a second state; and an assignment interchange logic having a set of inputs connected to respective data lines of the plurality of data lines that require interchanging, and having a set of outputs for outputting signals corresponding to the set of inputs with an output assignment determined by the state of the interchange control signal, wherein the assignment interchange logic outputs the data lines that require interchanging in an order that the first of the input data lines is assigned to the last of the outputs, the second of the input data lines is assigned to the second last of the outputs and likewise in a reversed order when the interchange control signal is in the first state; and wherein the assignment interchange logic outputs the data lines that require interchanging in an order that the first of the input data lines is assigned to the first of the outputs, the second of the input data lines is assigned to the second of the outputs and likewise in a forward order when the interchange control signal is in the second state.

2. An apparatus according to claim 1, wherein the floppy diskette drive data cable contains 34 data lines, and the data lines requiring interchanging include four of the 34 data lines including the tenth, the twelfth, the fourteenth, and the sixteenth data lines.

3. An apparatus according to claim 2, wherein the assignment interchange logic comprises:

a first multiplexer having first and second inputs;

a second multiplexer having first and second inputs;

a third multiplexer having first and second inputs; and a fourth multiplexer having first and second inputs, the first input of the first multiplexer being connected to the tenth data line, the first input of the second multiplexer being connected to the twelfth data line, the first input of the third multiplexer being connected to the fourteenth data line, and the first input of the fourth multiplexer being connected to the sixteenth data line; and the second input of the first multiplexer being connected to the sixteenth data line, the second input of the second multiplexer being connected to the fourteenth data line, the second input of the third multiplexers being connected to the twelfth data line, and the second input of the fourth multiplexer being connected to the tenth data line.

4. An apparatus according to claim 1, wherein the assignment interchange logic comprises a plurality of two-input multiplexers; wherein the first input of the first of the multiplexers is connected to the first of the data lines requiring interchanging, the first input of the second of the multiplexers is connected to the second of the data lines requiring interchanging and likewise in a forward order; and the second input of the first of the multiplexers is connected to the last of the data lines requiring interchanging, the second input of the second of the multiplexers is connected to the last second of the data lines requiring interchanging and likewise in a reverse order.

5. An apparatus according to claim 4, wherein the floppy diskette drive data cable contains 34 data lines, and the data lines requiring interchanging include four of the 34 data lines including the tenth, the twelfth, the fourteenth, and the sixteenth data lines.

6. An apparatus according to claim 5, wherein the assignment interchange logic comprises:

a first multiplexer having first and second inputs;

a second multiplexer having first and second inputs;

a third multiplexer having first and second inputs; and a fourth multiplexer having first and second inputs, the first input of the first multiplexer being connected to the tenth data line, the first input of the second multiplexer being connected to the twelfth data line, the first input of the third multiplexer being connected to the fourteenth data line, and the first input of the fourth multiplexer being connected to the sixteenth data line; and the second input of the first multiplexer being connected to the sixteenth data line, the second input of the second multiplexer being connected to the fourteenth data line, the second input of the third multiplexers being connected to the twelfth data line, and the second input of the fourth multiplexer being connected to the tenth data line.

7. An apparatus according to claim 1, wherein the interchange control logic comprises a register for storing the generated optional interchange control signal.

8. An apparatus according to claim 1 wherein the interchange control logic comprises a mechanical switch for generating the optional interchange control signal.

* * * * *